(12) United States Patent
Broomfield et al.

(10) Patent No.: US 12,034,359 B2
(45) Date of Patent: *Jul. 9, 2024

(54) COOLING MANIFOLD FOR ROTARY ELECTRIC MACHINE

(71) Applicant: LC ADVANCED MOTOR TECHNOLOGY CORPORATION, New York, NY (US)

(72) Inventors: Dylan Broomfield, Gansevoort, NY (US); Russel Hugh Marvin, Potsdam, NY (US); Matthew Honickman, Potsdam, NY (US)

(73) Assignee: LC Advanced Motor Technology Corporation, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/089,360

(22) Filed: Dec. 27, 2022

(65) Prior Publication Data

US 2023/0134826 A1    May 4, 2023

Related U.S. Application Data

(63) Continuation of application No. 16/745,419, filed on Jan. 17, 2020, now Pat. No. 11,539,269.

(51) Int. Cl.
*H02K 9/197* (2006.01)
*H02K 5/18* (2006.01)
*H02K 9/06* (2006.01)

(52) U.S. Cl.
CPC ............... *H02K 9/197* (2013.01); *H02K 5/18* (2013.01); *H02K 9/06* (2013.01)

(58) Field of Classification Search
CPC ............ H02K 3/24; H02K 9/19; H02K 9/193; H02K 9/197; H02K 9/06; H02K 5/18; H02K 5/20; H02K 5/203; H02K 5/207
See application file for complete search history.

(56) References Cited

U.S. PATENT DOCUMENTS 4,117,358 A  *  9/1978  Flick ..................... H02K 9/00
                                                         310/260
11,539,269 B2 * 12/2022  Broomfield ............ H02K 9/197
(Continued)

FOREIGN PATENT DOCUMENTS

DE       102013205418 A1    4/2014
KR      10-2014-0083308 A    7/2014
WO          2016177933 A1   11/2016

OTHER PUBLICATIONS

Apr. 20, 2021—(US) Search Report of PCT/US2020/63691.

*Primary Examiner* — Tulsidas C Patel
*Assistant Examiner* — Robert E Mates
(74) *Attorney, Agent, or Firm* — Darrell G. Mottley

(57) ABSTRACT

A rotary electric machine includes a stator extending along an axis and having teeth arranged about the axis. The teeth are circumferentially spaced apart by slots. Conductors extend around the teeth and through the slots. The conductors are electrically connected to one another to form phases. Cooling devices are provided in the slots. Each cooling device is fluidly connected to an inlet tube for supplying cooling fluid to the cooling device and an outlet tube for removing cooling fluid from the cooling device. A manifold includes a first cooling channel fluidly connected to each inlet tube and a second cooling channel fluidly connected to each outlet tube such that all the cooling devices in the machine are fluidly connected in parallel.

11 Claims, 15 Drawing Sheets

(56) References Cited

U.S. PATENT DOCUMENTS

| | | | |
|---|---|---|---|
| 2013/0076171 A1* | 3/2013 | Lepres | H02K 15/02 310/59 |
| 2014/0015347 A1 | 1/2014 | Marvin et al. | |
| 2014/0300220 A1* | 10/2014 | Marvin | H02K 3/24 29/596 |
| 2015/0207386 A1 | 7/2015 | Garrard et al. | |

* cited by examiner

COOLING MANIFOLD FOR ROTARY ELECTRIC MACHINE

CROSS-REFERENCE TO RELATED APPLICATIONS

This application claims priority to U.S. patent application Ser. No. 16/745,419, filed on Jan. 17, 2020. The contents of which are incorporated herein by reference.

TECHNICAL FIELD

The present invention relates generally to rotary electric machines, and specifically to a cooling manifold for rotary electric machines.

BACKGROUND

All electric motors and generators, i.e., rotary electric machines, generate heat during operation. The heat can be removed using a fluid such as air or a liquid. In some examples, the cooling structure is provided in the slot to provide more direct contact with the winding coils and thereby more effectively remove heat generated therefrom. A manifold can be used to coordinate the flow of the cooling liquid to, from, and between the slots.

SUMMARY

In one example, a rotary electric machine includes a stator extending along an axis and having teeth arranged about the axis. The teeth are circumferentially spaced apart by slots. Conductors extend around the teeth and through the slots. The conductors are electrically connected to one another to form phases. Cooling devices are provided in the slots. Each cooling device is fluidly connected to an inlet tube for supplying cooling fluid to the cooling device and an outlet tube for removing cooling fluid from the cooling device. A manifold includes a first cooling channel fluidly connected to each inlet tube and a second cooling channel fluidly connected to each outlet tube such that all the cooling devices in the machine are fluidly connected in parallel.

In another example, a rotary electric machine includes a stator extending along an axis and having teeth arranged about the axis. The teeth are circumferentially spaced apart by slots. Conductors extend around the teeth and through the slots. The conductors are electrically connected to one another to form phases. Cooling devices are provided in the slots. Each cooling device is fluidly connected to an inlet tube for supplying cooling fluid to the cooling device and an outlet tube for removing cooling fluid from the cooling device. A manifold includes a first cooling channel fluidly connected to each inlet tube and a second cooling channel fluidly connected to each outlet tube. For each cooling device the cooling fluid flows a first circumferential distance within the first cooling channel to the inlet tube and flows a second circumferential distance within the second cooling channel away from the outlet tube. The sum of the first and second circumferential distances is substantially equal for each cooling device.

In another example, a rotary electric machine includes a stator extending along an axis and having teeth arranged about the axis. The teeth are circumferentially spaced apart by slots. Conductors extend around the teeth and through the slots. The conductors are electrically connected to one another to form phases. Cooling devices are provided in the slots. Each cooling device is fluidly connected to an inlet tube for supplying cooling fluid to the cooling device and an outlet tube for removing cooling fluid from the cooling device. A manifold includes a first cooling channel fluidly connected to each inlet tube and a second cooling channel fluidly connected to each outlet tube. At least one motor connection is electrically connected to the conductors and secured to the manifold outside the first and second cooling channels. The at least one motor connection is aligned with the first and second cooling channels such that heat generated in the at least one motor connection is removed by the cooling fluid flowing through the first and second cooling channels.

In another example, a manifold for a rotary electric machine having a stator extending along an axis and includes teeth arranged about the axis. The teeth are circumferentially spaced apart by slots. Conductors extend around the teeth and through the slots. A cooling device is provided in each slot and has an inlet tube and outlet tube associated therewith. The manifold includes a first cooling channel fluidly connected to the inlet tubes of the cooling devices and a second cooling channel fluidly connected to the outlet tubes of the cooling devices such that all the cooling devices in the machine are fluidly connected in parallel.

In another example, a rotary electric machine includes a stator forming a housing extending along an axis and having teeth arranged about the axis. The teeth are circumferentially spaced apart by slots. Conductors extend around the teeth and through the slots. The conductors are electrically connected to one another to form phases. A rotor is rotatable within and relative to the stator. A fan includes a shaft secured to and rotatable with the rotor for generating airflow to cool the rotor.

Other objects and advantages and a fuller understanding of the invention will be had from the following detailed description and the accompanying drawings.

DETAILED DESCRIPTION

Figure 1:
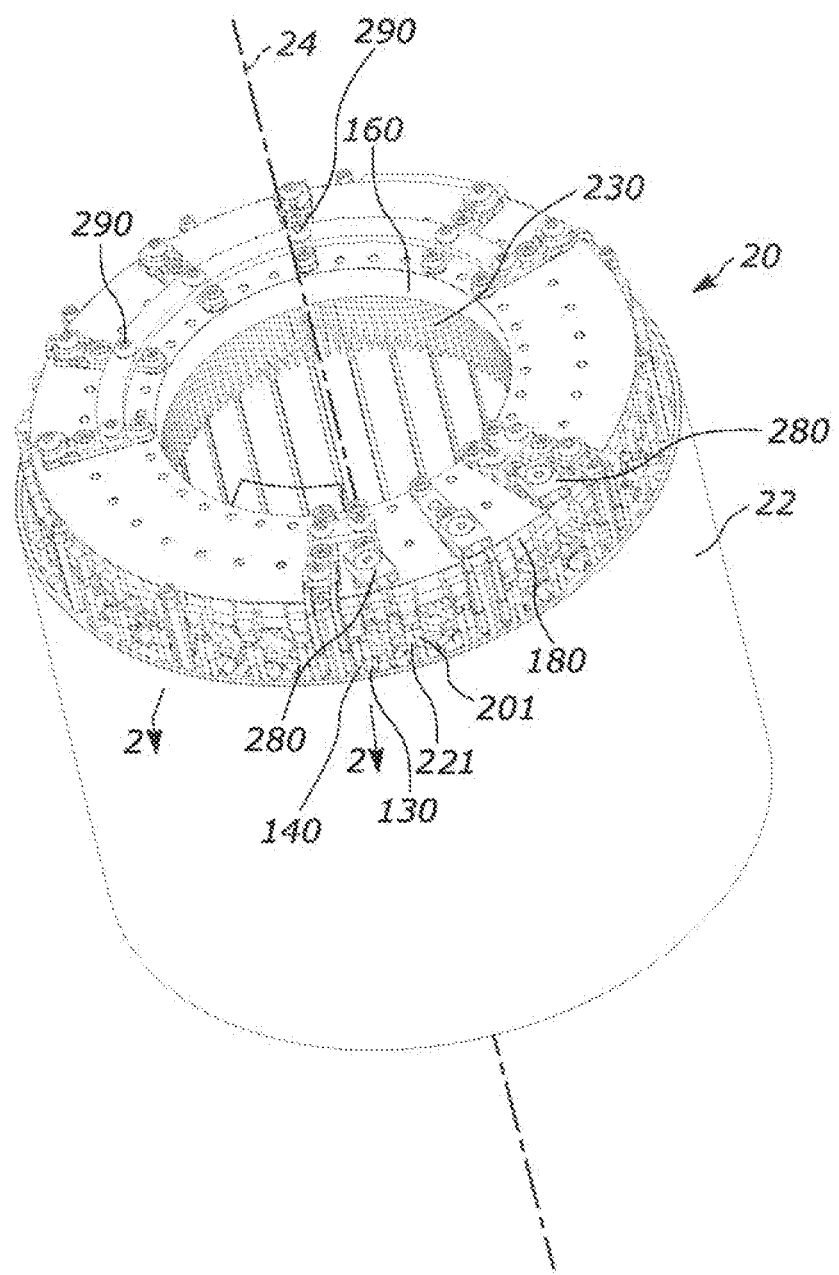
FIG. 1 is a front view of a rotary electric machine having an example cooling manifold.
Figure 2:
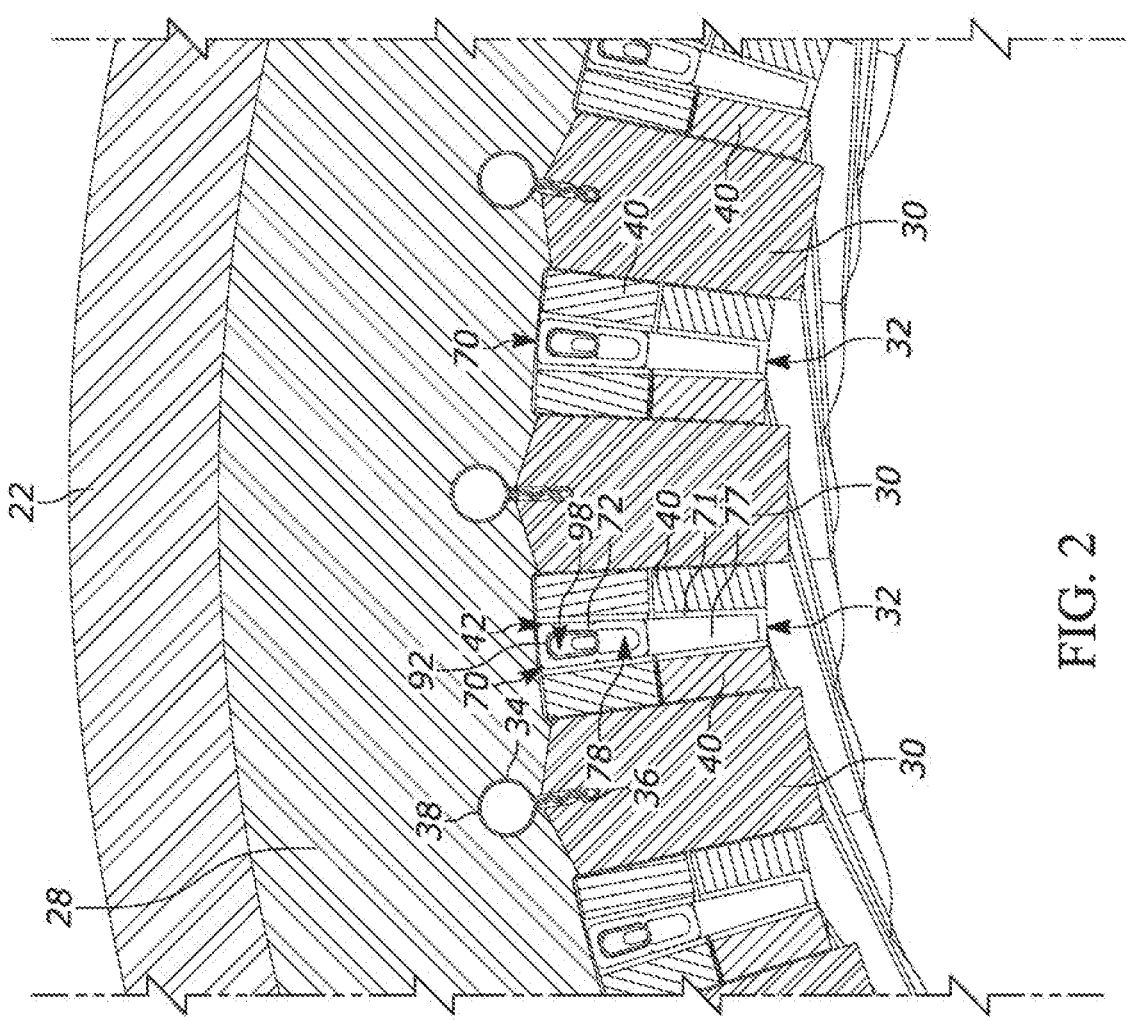
FIG. 2 is a section view of the rotary electric machine taken along lines 2-2 of FIG. 1.

The present invention relates generally to rotary electric machines, and specifically to a cooling manifold for rotary electric machines. Referring to FIGS. 1-2, one example rotary electric machine 20 includes a stator 22 extending about and along an axis 24 and forming a housing. The stator 22 includes a ring-shaped core 28 formed from stacked laminations formed from an electrically conductive material.

Teeth 30 extend radially inward from the core 28 towards the axis 24. The teeth 30 are arranged circumferentially about the axis 24 and extend substantially the entire axial length of the stator 22. The teeth 30 can be releasably connected to the core 28 with tooth retention devices 34 or integrally formed therewith (not shown). As shown, each tooth retention device 34 extends into a slot 36 in one of the teeth 30 and a slot 38 in the core 28. Regardless, the teeth 30 are circumferentially spaced apart from one another by slots 32.

Winding coils or coils 40 formed from one or more conductors, e.g., electrically conductive material such as copper, are wound around the teeth 30 and pass through the slots 32. In one example, the winding coils 40 are wound in a 3-phase configuration such that a portion of the winding coils are in phase A, a portion of the winding coils are in phase B, and a portion of the winding coils are in phase C. Each phase A-C receives the same or substantially the same amount of current. Other phase configurations are contemplated. Multiple winding coils 40 can be electrically connected in series or in parallel and still receive the same amount of current. In a 3-phase configuration, phases can be connected in either a wye or delta configuration.

In the 3-phase configuration, the current can flow from a junction box (not shown) to motor connections 280 electrically connected to the winding coils 40. The current flows from the connections 280, through the winding coils 40, and to motor connections 290. In one example, the motor connections 280 are bus bar connections and the motor connections 290 are star point connections. Regardless, the motor connections 280, 290 are axially aligned with the stator 22 and positioned outside the slots 32.

The winding coils 40 can be wound onto the stator 22 in any number of known manners, e.g., concentrated wound, distributed wound or hairpin wound. As shown, the winding coils 40 are formed from rectangular wire bent into a diamond shape and distributed wound around the teeth 30. The winding coils 40 are oriented in the slot 32 such that in cross-section the length (the longer dimension) extends radially towards the axis 24. The width (the smaller dimension) extends generally circumferentially about the axis 24. Multiple winding coils 40 in the same slot 32 are arranged abutting or adjacent one another in the radial direction and abutting or adjacent the associated tooth 30.

A circumferential space or gap 42 can be formed in the slot 32 between adjacent pairs of winding coils 40. A cooling device 70 is provided within each gap 42 for cooling the winding coils 40 during operation of the rotary electric machine 20. A liner 71 formed from electrically insulating material, e.g., an aramid polymer, is provided in the gap 42 and is wrapped around the cooling device 70. Consequently, the liner 71 is provided circumferentially between the winding coils 40 in the same slot 32 and circumferentially between the cooling device 70 and each winding 40. The liner 71 can extend substantially the entire axial and radial lengths of the slot 32. Alternatively, the liner 71 can be omitted (not shown) such that the cooling device 70 abuts multiple winding coils 40 in the slot 32.

Figure 3A:
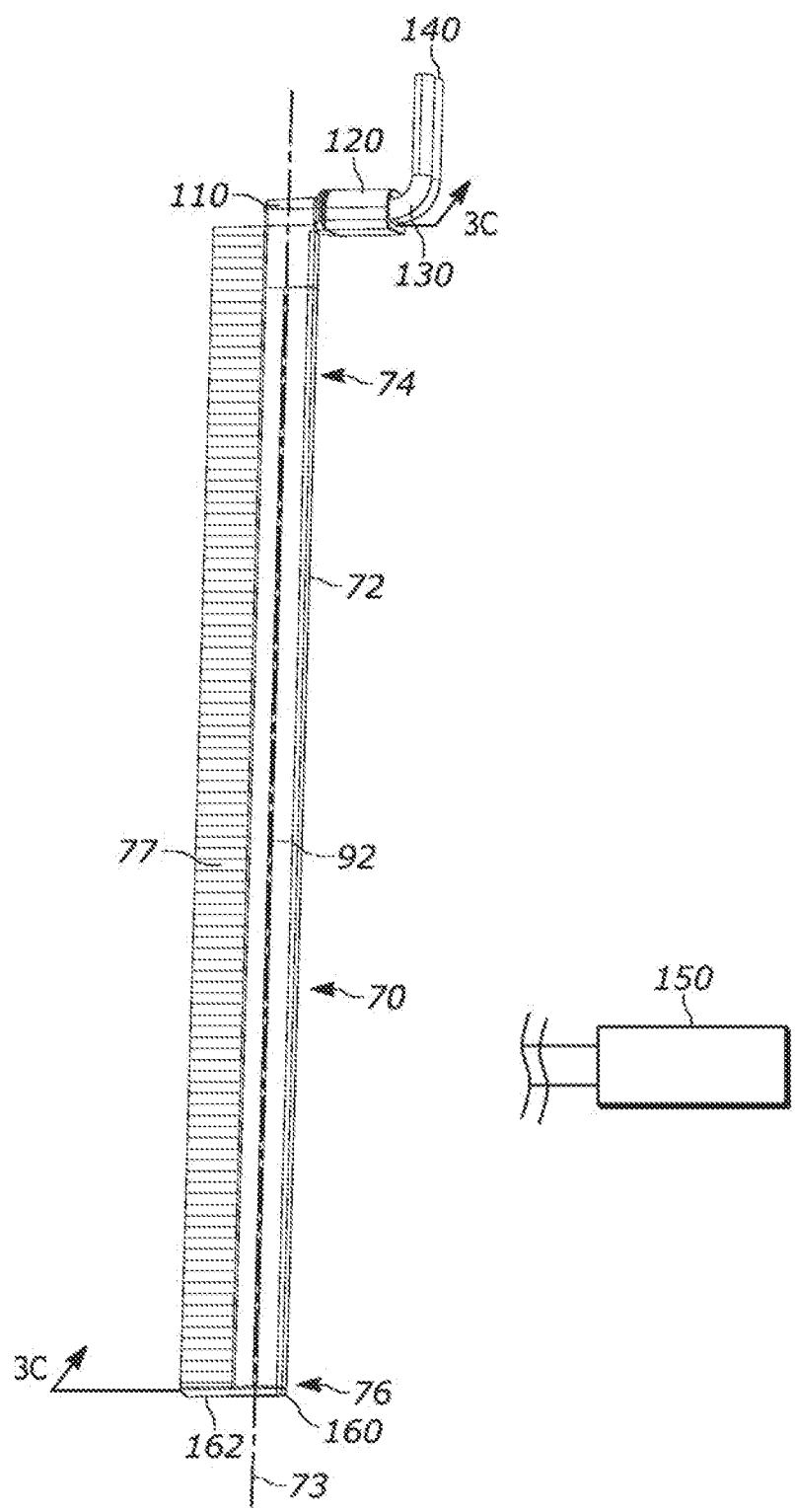
FIG. 3A is a front view of a cooling device for the rotary electric machine.
Figure 3B:
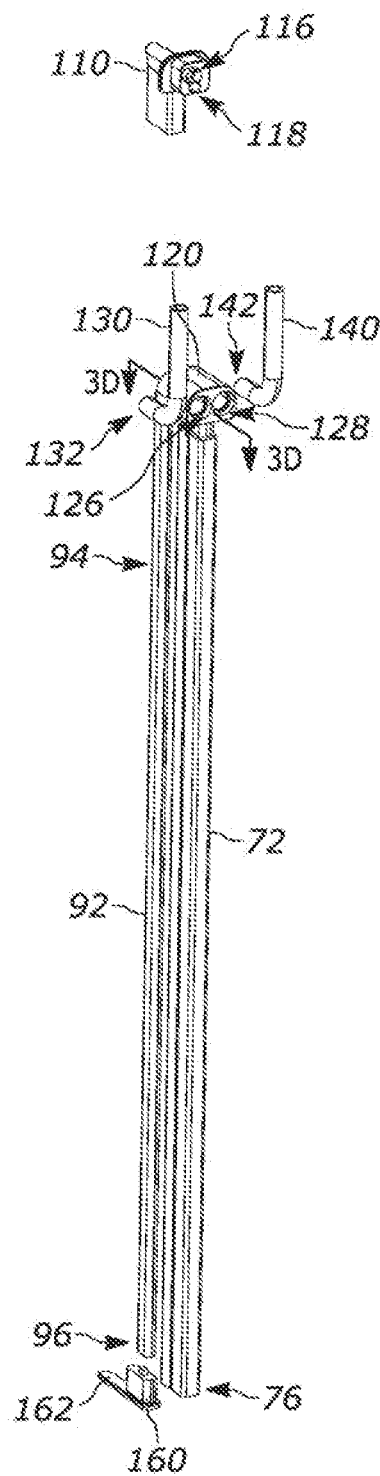
FIG. 3B is an exploded view of a portion of the cooling device of FIG. 3A.

Referring to FIGS. 3A-3B, the cooling device 70 includes first and second tubes 72, 92 for providing a bi-directional flow path for cooling fluid within each slot 32. As shown, the first tube 72 is on outer tube and the second tube 92 is an inner tube. A conductive tab 77 formed from stacked laminations is secured along the length of the first tube 72. The tab 77 can be secured to the first tube 72 via brazing, soldering, etc. To this end, the tab 77 can be secured to the first tube 72 in the manner shown and described in U.S. application Ser. No. 15/394,522, the entirety of which is incorporated by reference herein. The tubes 72, 92 and tab 77 can be formed from conductive materials, such as aluminum and copper-based materials. The tubes 72, 92, and tab 77 can be formed from the same material or different materials.

Figure 3C:
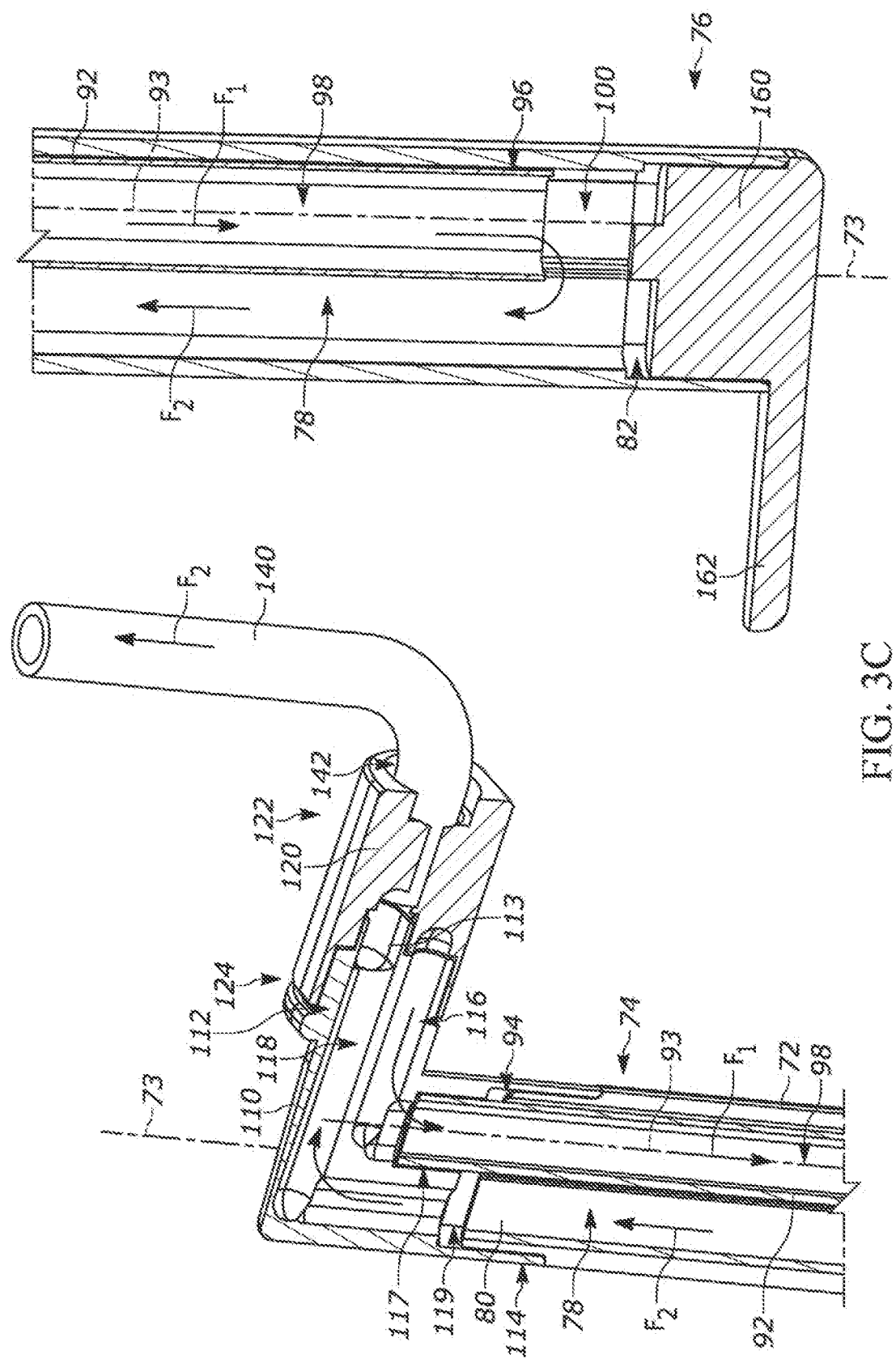
FIG. 3C is a section view of the cooling device taken along lines 3C-3C of FIG. 3A-3A.

As further shown in FIG. 3C, the first tube 72 extends along a centerline 73 from a first end 74 to a second end 76. A passage 78 extends the entire length of the first tube 72. A hollow projection 80 is provided at the first end 74 and extends along the centerline 73. A countersink 82 extends from the second end 76 towards the first end 74 and is coaxial with the centerline 73.

The second tube 92 extends along a centerline 93 from a first end 94 to a second end 96. A passage 98 extends the entire length of the second tube 92. The second tube 92 is positioned within the passage 78 of the first tube 72. As shown, the centerlines 73, 93 of the first and second tubes 72, 92 are offset from one another.

Figure 4:
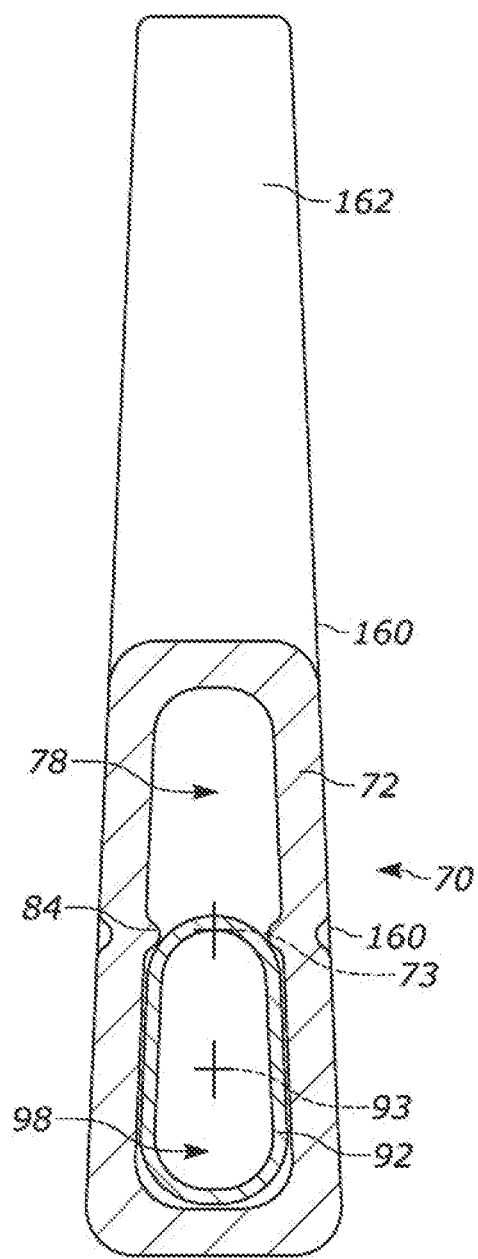
FIG. 4 is a top view of a portion of the cooling device.

The first and second tubes 72, 92 can be secured to one another. In one example, one or more projections 84 (see FIG. 4) are provided along the length of the first tube 72 and extend radially towards the centerline 73. The projections 84 engage the second tube 92 to pin or secure the second tube in place within the first tube 72. The projections 84 can be formed by crimping the first tube 72 inward into the passage 78 while the second tube 92 is disposed therein. Alternatively, the first tube 72 can be drawn, e.g., cold drawn, through a die to include the projections 84. In any case, the projections 84 prevent or limit relative axial and rotational movement between the tubes 72, 92.

Alternatively or additionally, the first and second tubes 72, 92 can be secured to one another with a metallurgical bond, which can be accomplished by, for example, a brazed connection, a welded connection, a solid state welded connection or a soldered connection. The connection can extend the entire length of the second tube 92 or along portions of the length of the second tube. In another example, the first and second tubes 72, 92 are not secured to one another (not shown).

Regardless, the second tube 92 is positioned within the first tube 72 such that the first end 94 of the second tube extends axially beyond the first end 74 of the first tube (FIG. 3B). The lengths of the first and second tubes 72, 92 are configured such that this positions the second end 96 of the second tube 92 offset from the second end 76 of the first tube. More specifically, the second end 96 of the second tube 92 is longitudinally recessed or spaced from the countersink 82 to form a longitudinal space or gap 100 therebetween. Accordingly, the tubes 72, 92 can have the same axial length and be axially shifted or offset from one another to achieve the gap 100.

An end cap 110 is secured to the first ends 74, 94 of the first and second tubes 72, 92. The end cap 110 extends from a first end 112 to a second end 114. As shown, the end cap 110 is substantially L-shaped. The end cap 110 includes a first passage 116 and a second passage 118 each extending the length of the end cap. The first passage 116 is fluidly connected to the passage 98 in the second tube 92. The second passage 118 is fluidly connected to the passage 78 in the first tube 72.

A hollow projection 113 is provided on the first end 112 of the end cap 110 and is aligned with the second passage 118. A countersink 119 is provided in the second end 114 of the end cap 110 for slidably receiving the projection 80 on the first end 74 of the first tube 72. The second end 114 of the end cap 110 also includes a recess 117 for slidably receiving the first end 94 of the second tube 92. The positioning and depths of the recess 117 and countersink 119 in the second end 114 of the end cap 110 longitudinally offset the first ends 74, 94 from one another, thereby offsetting the second ends 76, 96 from one another.

Figure 3D:
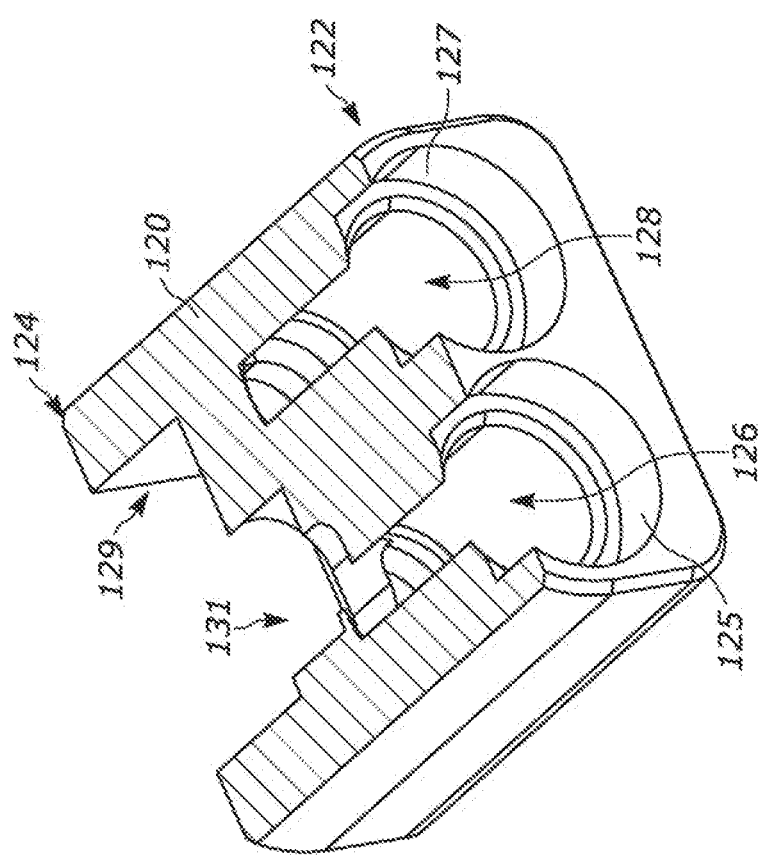
FIG. 3D is a section view of the cooling device taken along lines 3D-3D of FIG. 3B-3B.

A coupling 120 (see also FIG. 3D) is secured to the first end 112 of the end cap 110. The coupling 120 extends from a first end 122 to a second end 124. First and second passages 126, 128 extend the length of the coupling 120. The passages 126, 128 include respective countersinks 125, 127 at the first end 122. A first recess 129 extends into the second end 124 and is in fluid communication with the second passage 128. A second recess 131 extends from the first recess 129 to the first passage 126 for fluidly connecting the same. The first recess 129 slidably receives the first end 112 of the end cap 110. The second recess 131 slidably receives the projection 113 on the first end 112. Consequently, the first passage 126 is fluidly connected to the first passage 116 in the end cap 110. The second passage 128 is fluidly connected to the second passage 118 in the end cap 110.

The interfaces between the first and second tubes 72, 92, the end cap 110, and the coupling 120 can be fluidly sealed in several ways. For example, the interfaces can be brazed, soldered, welded (such as solid state welding) or crimped together. In each case, the interfaces are securely held together in a fluid-tight manner.

A pair of tubes 130, 140 extends into the first and second passages 126, 128, respectively, in the first end 122 of the coupling 120. The tubes 130, 140 are fluidly connected to a reservoir 150 (see FIG. 3A) holding cooling fluid. The cooling fluid can be, for example, water, ethylene glycol or mixtures thereof.

An end cap 160 (FIGS. 3A and 3C) is received in the countersink 82 in the second end 76 of the first tube 72 for closing the second end without sealing or closing the second end 96 of the second tube 92. In other words, the end cap 160 does not eliminate the gap 100. This forms a closed path for the flow of cooling fluid through the cooling device 70. A projection 162 on the end cap 160 receives the tab 77 of laminations.

The cooling device 70 is oriented in the slot 32 such that the end cap 110 extends from the tubes 72, 92 radially outward and away from the axis 24 (see FIGS. 1 and 2). The end cap 110 and coupling 120 are in close proximity with or engaging the axial (top as shown) end of the core 28. The tab 77 extends radially inward from the first tube 72 towards the axis 24. The liner 71 can extend around the tab 77.

Figure 5:
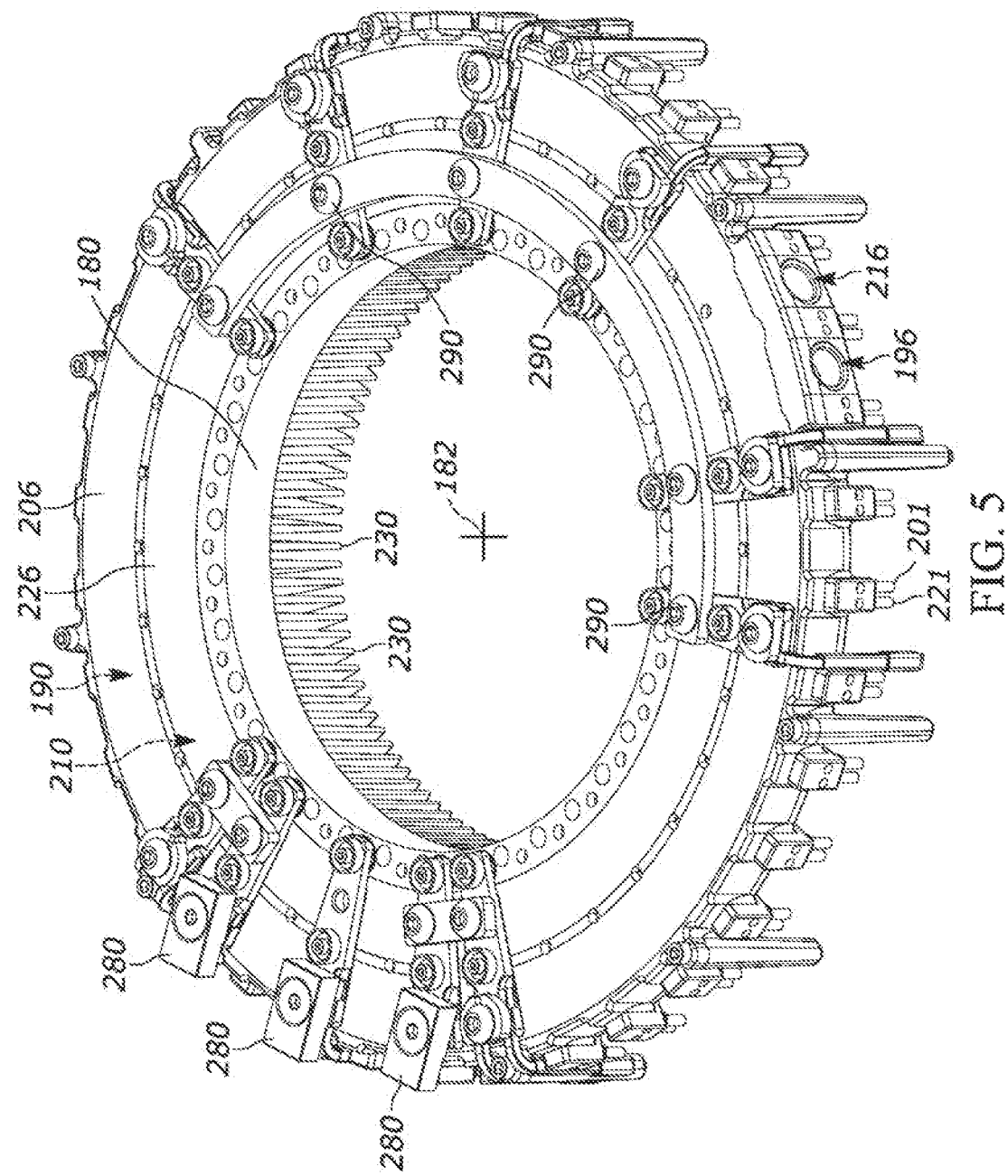
FIG. 5 is a top view of a manifold and motor connections of the rotary electric machine.

A manifold 180 is secured to the stator 22 for helping route cooling liquid between the fluid reservoir 150 and all the cooling devices 70 in the rotary electric machine 20. Referring to FIGS. 5-6B, the manifold 180 is annular and extends about an axis 182. First and second cooling channels 190, 210 extend circumferentially about the axis 182 in a generally concentric manner. The first cooling channel 190 is positioned radially outward of the second cooling channel 210.

The first cooling channel 190 extends from a first end 192 to a second end 194 spaced circumferentially from one another. An inlet passage 196 extends radially outward from the first end 192 and is fluidly connected to the fluid reservoir 150. Cover plates 206 fluidly seal the first cooling channel 190. In one example, the cover plates 206 are friction stir welded to the manifold 180, i.e., the cover plates have a metallurgical bond with the manifold.

The second cooling channel 210 extends from a first end 212 to a second end 214 spaced circumferentially from one another. The first ends 192, 212 of the cooling channels 190, 210 are substantially radially aligned with one another. The second ends 194, 224 of the cooling channels 190, 210 are substantially radially aligned with one another. An outlet passage 216 extends radially outward from the first end 212 and is fluidly connected to the fluid reservoir 150. Cover plates 226 fluidly seal the second cooling channel 210. In one example, the cover plates 226 are friction stir welded to the manifold 180.

Tubes 201, 221 are provided around the periphery of the manifold 180 and can extend axially therefrom. The tubes 201 receive the inlet tubes 130 of the cooling devices 70. The tubes 221 receive the outlet tubes 140 of the cooling devices 70.

Connecting passages 200 (see also FIG. 6C) are provided in the manifold 180 and help to fluidly connect the inlet tubes 130 of the cooling devices 70 to the first cooling channel 190. To this end, each connecting passage 200 extends radially through the manifold 180 from a first opening 202 fluidly connected to one of the tubes 201 associated with a respective cooling device 70 to a second opening 204 fluidly connected to the first cooling channel 190. In one example, the second openings 204 can be arranged in an annular pattern about the axis 182 (see FIG. 6A).

Similarly, connecting passages 220 help to fluidly connect the outlet tubes 140 of the cooling devices 70 to the second cooling channel 210. To this end, each connecting passage 220 extends radially through the manifold 180 from a first opening 222 fluidly connected to one of the tubes 221 associated with a respective cooling device 70 to a second opening 224 fluidly connected to the second cooling channel 210. In one example, the second openings 224 can be arranged in an annular pattern about the axis 182 (see FIG. 6A). The manifold 180 therefore fluidly connects the inlet and outlet tubes 130, 140 of every cooling device 70 in the rotary electric machine 20 to the fluid reservoir 150.

In operation (see FIGS. 6A and 6C), cooling fluid flows from the reservoir 150 and enters the manifold 180 through the inlet passage 196 in the manner $M_1$. The cooling fluid then flows into the first end 192 of the cooling channel 190 and circumferentially about the axis 182 in the manner $M_2$. This allows the cooling fluid to pass axially into every second opening 204 in the first cooling channel 190 in a parallel manner. From there, the cooling fluid flows radially outward through the connecting passages 200 to the first openings 202 in the manner $M_3$ and enters each cooling device 70 by flowing through the tubes 130, 201 into the passage 126 (see FIG. 3B). Consequently, all the cooling devices 70 can be fluidly connected to one another in parallel via the second openings 204. It will be appreciated, however, that one or more of the second openings 204 can be blocked or plugged (see also FIG. 6D) to prevent cooling fluid from flowing therein and thereby prevent cooling fluid from flowing from the first cooling channel 190 to the cooling device(s) 70 associated with the blocked second opening(s).

The cooling fluid then passes through the passage 116 and into the passage 98 at the first end 94 of the second tube 92 (see FIG. 3C). The cooling fluid flows downward (as shown) in the manner indicated by the arrow $F_1$ through the slot 32 and between the winding coils 40. The cooling fluid exists the passage 98 at the second end 96 of the second tube 92 and is turned around in the gap 100 by the end cap 160.

This configuration allows the cooling fluid to then pass upward (as shown) in the manner indicated by the arrow $F_2$ through the passage 78 in the first tube 72. The cooling device 70 therefore provides for bidirectional flow of cooling liquid within the slot 32 associated therewith. It will be appreciated that the cooling liquid could also flow in the opposite direction, namely, in the direction $F_1$ through the tube 140 and in the direction $F_2$ through the tube 130.

In either case, the cooling fluid flows in a U-shaped or substantially U-shaped loop entirely within the slot 32. In other words, the cooling fluid does not exit the slot 32 between entering the second tube 92 and exiting the first tube 72, thereby avoiding cooling loops around the teeth 30. This helps reduce circulating currents and increase motor performance.

The cooling fluid then exits the passage 78 at the first end 74 of the first tube 72, flows through the passages 118, 128, and exits the cooling device 70 through the tube 140. Referring back to FIG. 6C, the cooling fluid then passes into the first opening 222 via the tube 221, flows through the connecting passage 220 in the manner $M_4$, and enters the second cooling channel 210 through the second opening 224. This is repeated for every cooling device 70 such that cooling fluid exits all the cooling devices 70 and flows into the second cooling channel 210 in the manifold 180 in a parallel manner.

When one or more of the second openings 204 is blocked or plugged (FIG. 6D), a bypass tube 251 can connect the tube 221 associated with one cooling device 70 with the tube 201 of the circumferentially adjacent cooling device. As a result, the cooling fluid exiting one cooling device 70 flows to the bypass tube 251 in the manner indicated by the arrow S into the adjacent cooling device rather than returning to the manifold 180. That said, the cooling devices 70 connected by the bypass tubes 251 are fluidly connected in series with one another. This serial connection continues until the cooling liquid reaches a tube 211 fluidly connected to the second cooling channel 210 instead of a bypass tube 251. Once the cooling fluid flows from any tube 211 to the second cooling channel 210, the cooling fluid then flows circumferentially about the axis 182 through the second cooling channel in the manner $M_5$ to the outlet passage 216 and back to the reservoir 150 in the manner $M_6$.

Figure 6A:
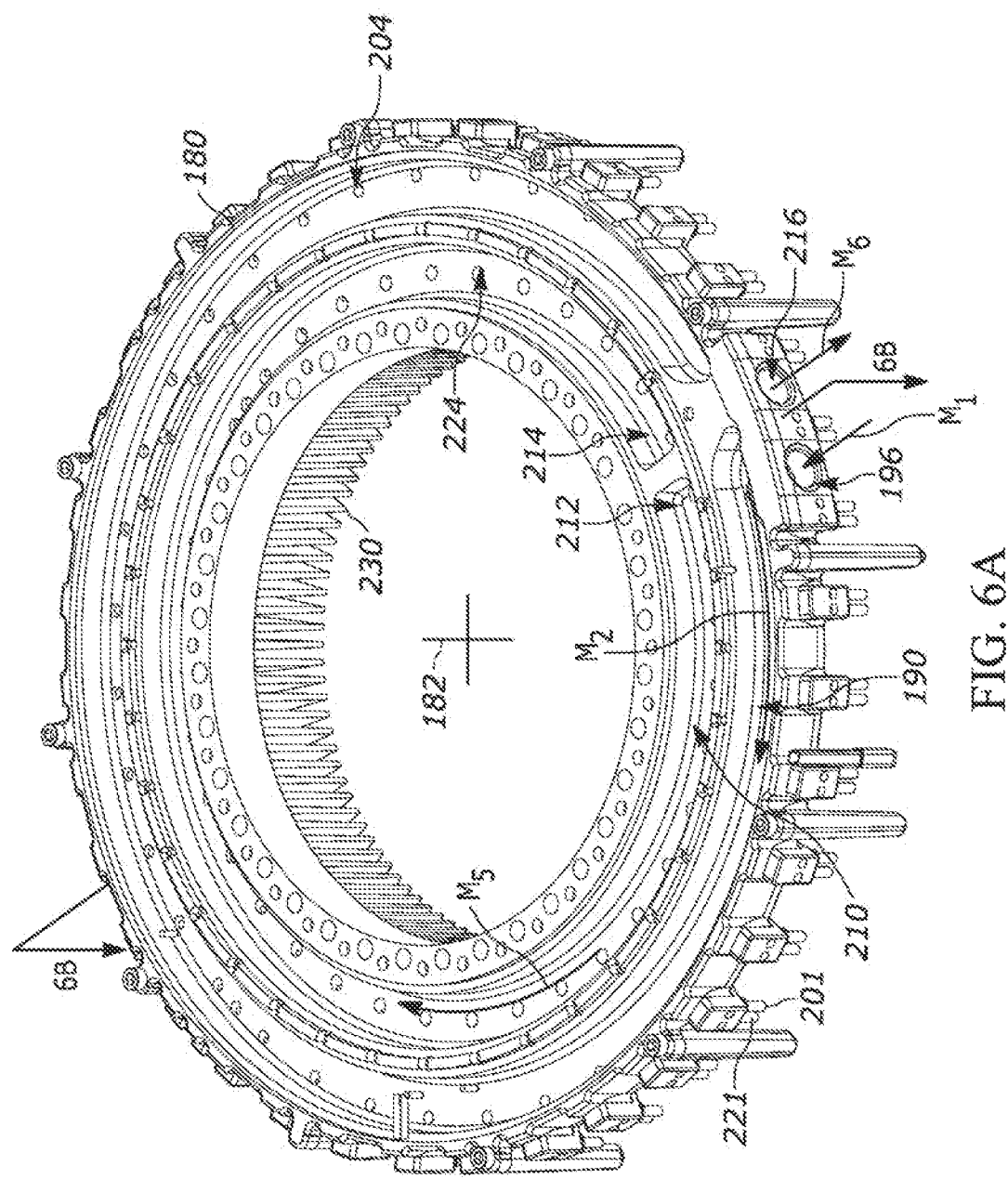
FIG. 6A is a top view of the manifold of FIG. 5 with the motor connections and cover plates.
Figure 6B:
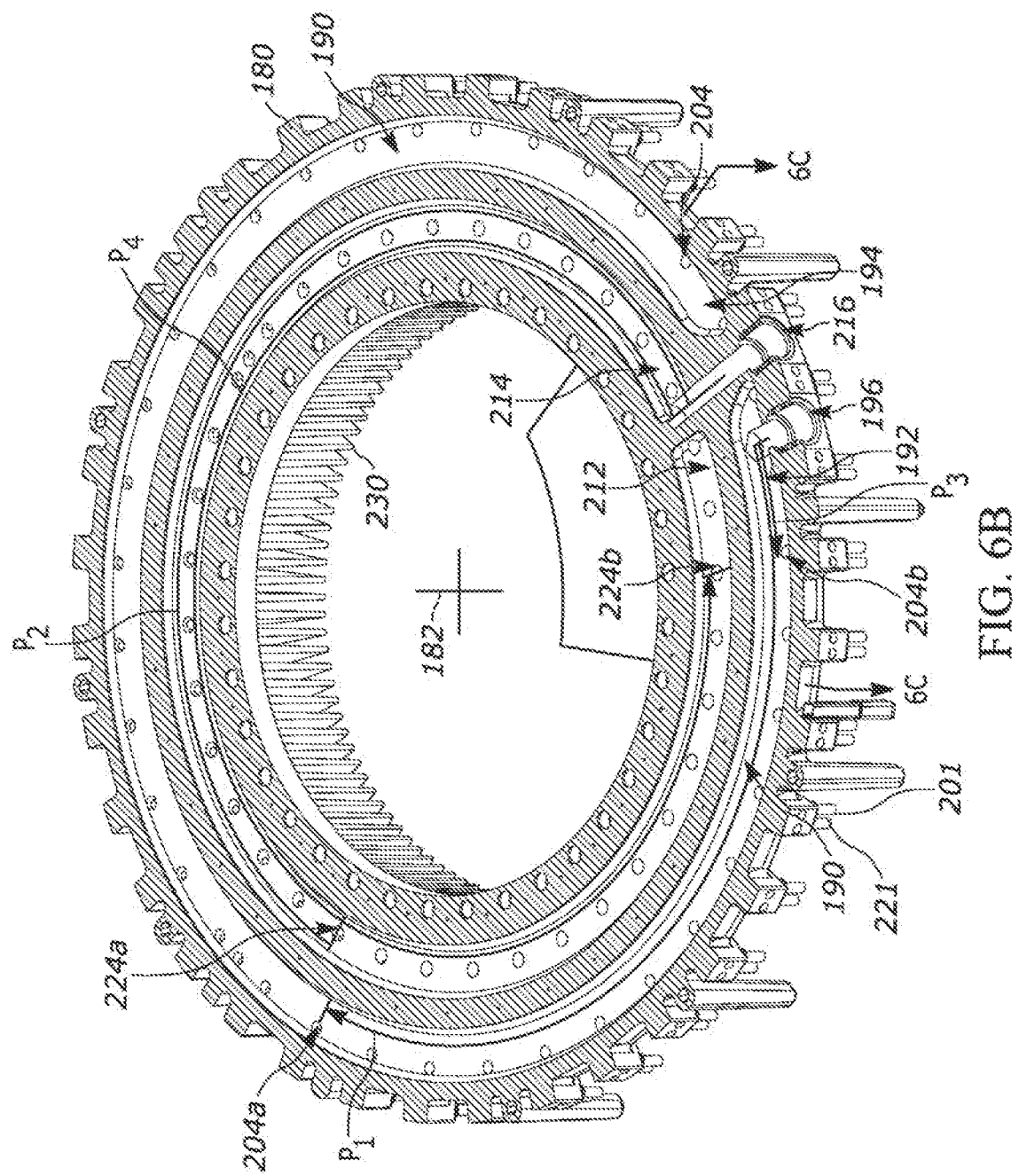
FIG. 6B is a section view of the manifold of FIG. 6A taken along line 6B-6B.
Figure 6C:
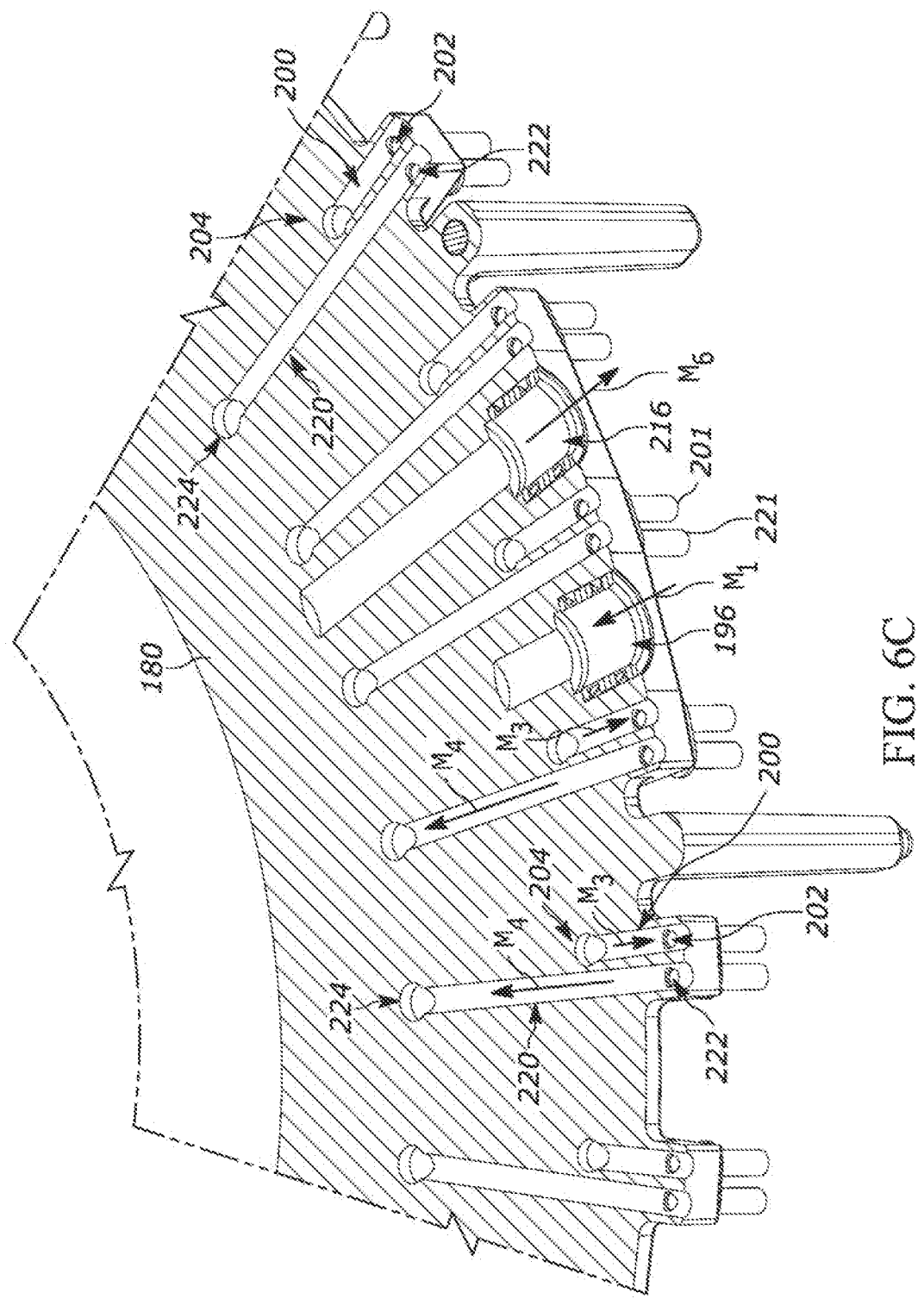
FIG. 6C is a section view of the manifold of FIG. 6B taken along line 6C-6C.
Figure 6D:
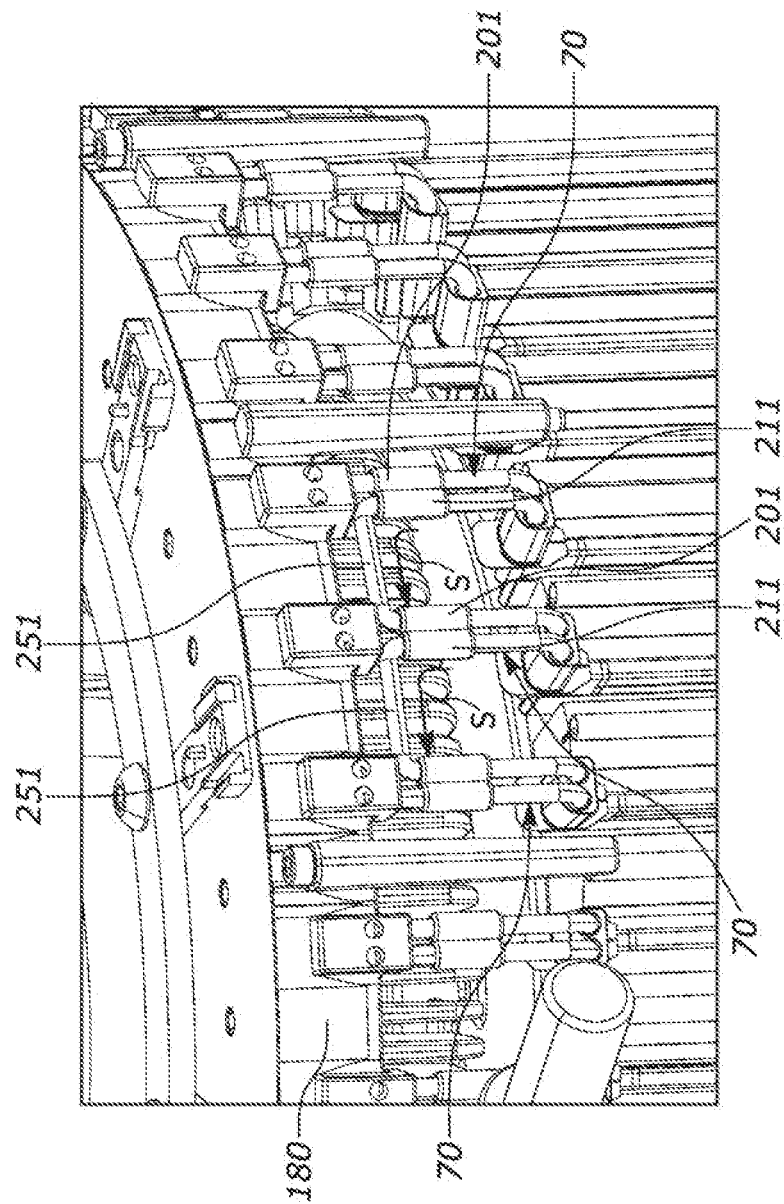
FIG. 6D is an enlarged view of portion of FIG. 6C in which the cooling devices are fluidly connected in series.

The cooling fluid can flow in the same direction in the first and second cooling channels 190, 210, e.g., clockwise as viewed in FIG. 6A. The cooling channels 190, 210, first openings 202, 222, and second openings 204, 224 are configured to provide balanced fluid flow through the manifold 180. More specifically, the manifold 180 is configured such that all the cooling devices 70 experience the same or substantially the same pressure drop and flow rates therethrough. To this end, the total length of the fluid flow path in the manifold 180 to and from each cooling device 70 is substantially the same throughout the rotary electric machine 20.

For example and referring to FIG. 6B, when cooling fluid enters the manifold 180 through the inlet passage 196, a flow path $P_1$ associated with a first cooling device (not shown) extends within the first cooling channel 190 from the inlet passage to a second opening 204a (the suffix "a" being added for clarity) associated with the inlet tube 130 of the first cooling device. After flowing through the first cooling device 70, the cooling fluid flows along a flow path $P_2$ within the second cooling channel 210 from the second opening 224a associated with the first cooling device to the outlet passage 216. The flow paths $P_1$, $P_2$ extend a total circumferential distance C through the manifold 180 and about the axis 182.

Similarly, a flow path $P_3$ associated with a second cooling device 70 (not shown) extends within the first cooling channel 190 from the inlet passage 196 to a second opening 204b associated with the inlet tube 130 of the second cooling device. After flowing through the second cooling device, the cooling fluid flows along a flow path $P_4$ within the second cooling channel 210 from the second opening 224b associated with the second cooling device to the outlet passage 216. The flow paths $P_3$, $P_4$ extend the total circumferential distance C through the manifold 180 and about the axis 182. Every remaining cooling device 70 connected to the manifold 180 has the same or substantially the same flow path distance C through the cooling channels 190, 210. Consequently, the cooling path through the manifold 180 associated each cooling device 70 will have the same pressure drop. This is facilitated by positioning the openings 202, 222 in substantial radial alignment with the openings 204, 224 for each cooling device 70 and/or positioning the inlet and outlet passages 196, 216 in close proximity with one another.

Figure 7A:
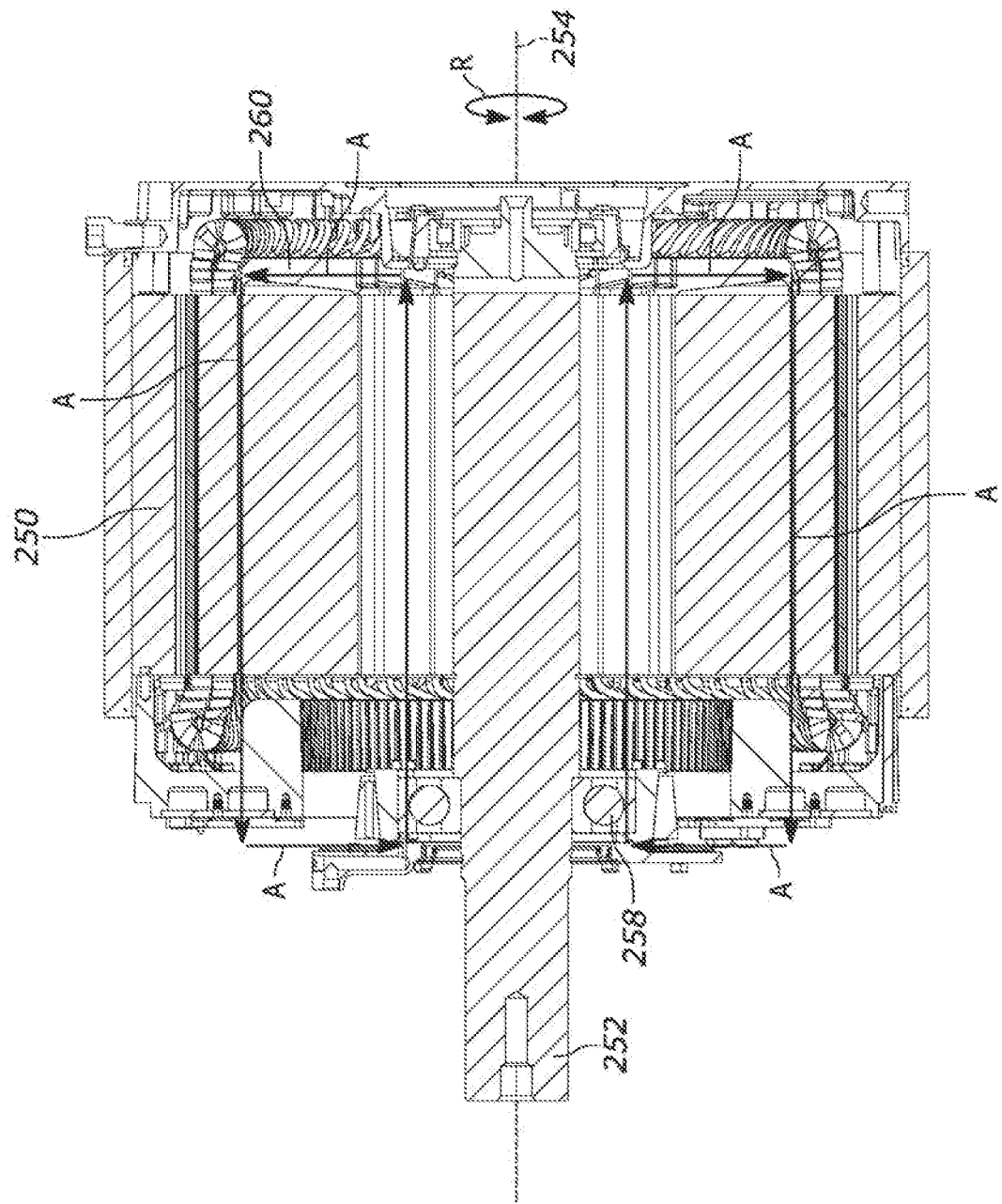
FIG. 7A is a section view of a rotor of the rotary electric machine.
Figure 7B:
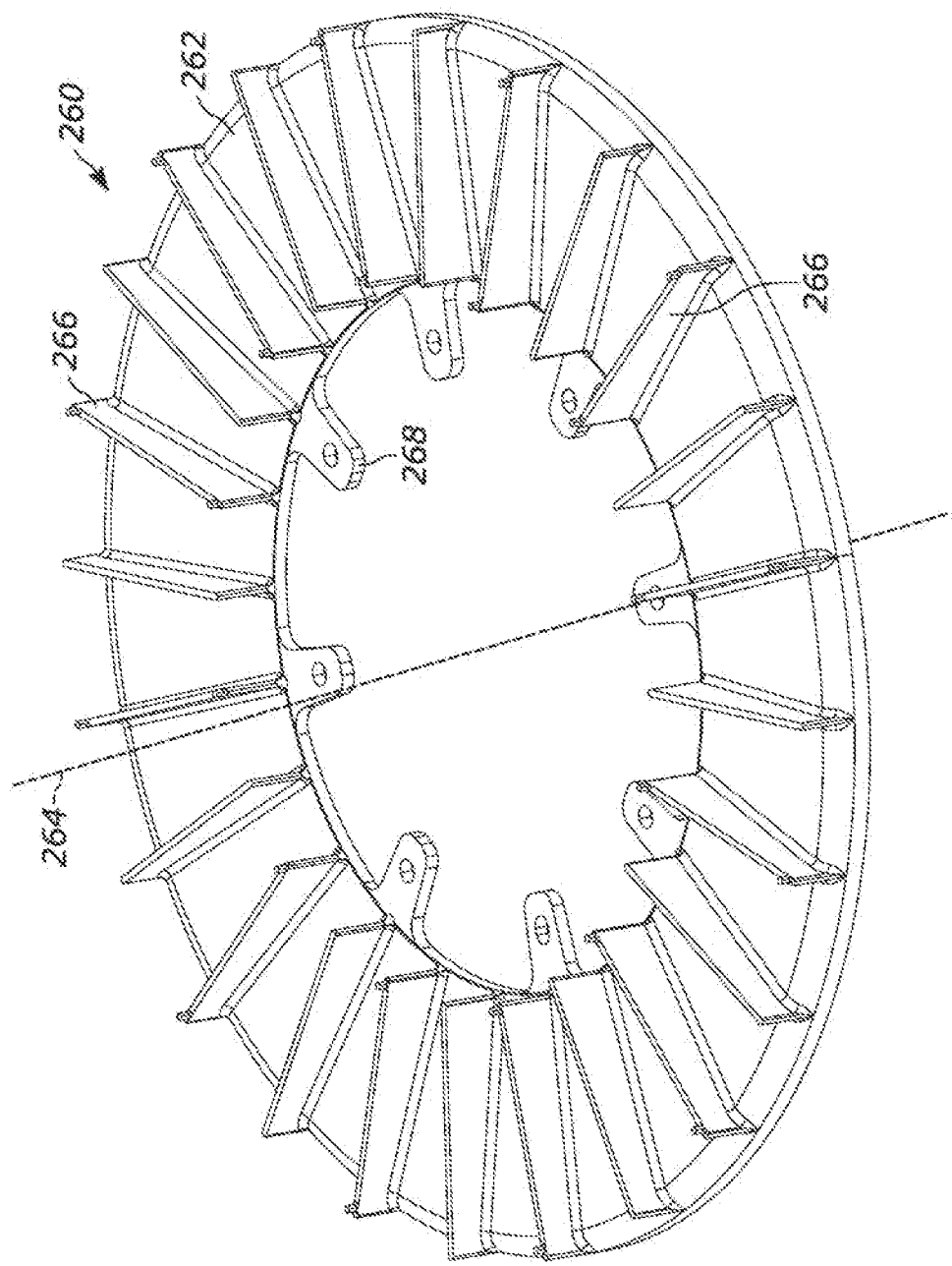
FIG. 7B is a front view of a fan rotatable with the rotor of FIG. 7A.

In addition to using cooling fluid to help cool the winding coils 40, the manifold 180 shown and described herein is also configured to help cool a rotor 250 (see FIGS. 7A-7B) of the rotary electric machine 20. The rotor 250 is secured to and rotatable with a shaft 252 about an axis 254. A bearing 258 connected to the shaft 252 is mounted to the stator 22 (not shown) such that the axes 24, 254 are coaxial. Consequently, the rotor 250 rotates about the axis 24 within and relative to the stator 22.

A fan 260 is fixed to the shaft 252 and therefore rotates with the rotor 250. The fan 260 includes an annular base 262 extending about and centered on an axis 264. Fins or blades 266 are provided on the base 262 and extend radially towards the axis 264. The number of blades 266 can be equal to or different from the number of slots 32 in the stator 22. In one example, the number of blades 266 is not a common multiple of the number of slots 32. The number of blades 266 can also not be a common multiple as the number of magnetic poles in the stator 22. In another example, the number of blades 266 is a prime number.

It will be appreciated that changing the number of blades 266 affects the acoustic noise of the fan 260. More specifically, if the number of blades 266 is a common multiple with the number of slots 32, for instance, then some number of blades will pass by slots at the same time, causing a distinct and audible frequency proportional to the motor speed. That said, changing the number of blades 266 so that there is never more than one blade passing a slot 32 at the same time greatly reduces the audible noise.

The direction of radial extension of the blades 266 can intersect the axis 264 or be offset/spaced therefrom. Each blade 266 can have a rectangular shape and a thickness in the circumferential direction that is constant along its length or variable (not shown). The blades 266 can be straight (as shown) or curved (not shown). Tabs 268 extend radially inward from the base 262 and receive fasteners (not shown) for securing the fan 260 to the shaft 252.

With this in mind, fins 230 (see FIGS. 5 and 8) extend axially away from the manifold 180 and are arranged in an annular pattern about the axis 182. The fins 230 are formed from a thermally conductive material and collectively encircle the rotor 250. When the rotor 250 includes permanent magnets, it is desirable to limit the temperature thereof in an effort to maintain their strength and help prevent demagnetization. When the rotor 250 includes copper bars, it is desirable to limit the temperature thereof to reduce electrical resistance and increases efficiency.

Figure 8:
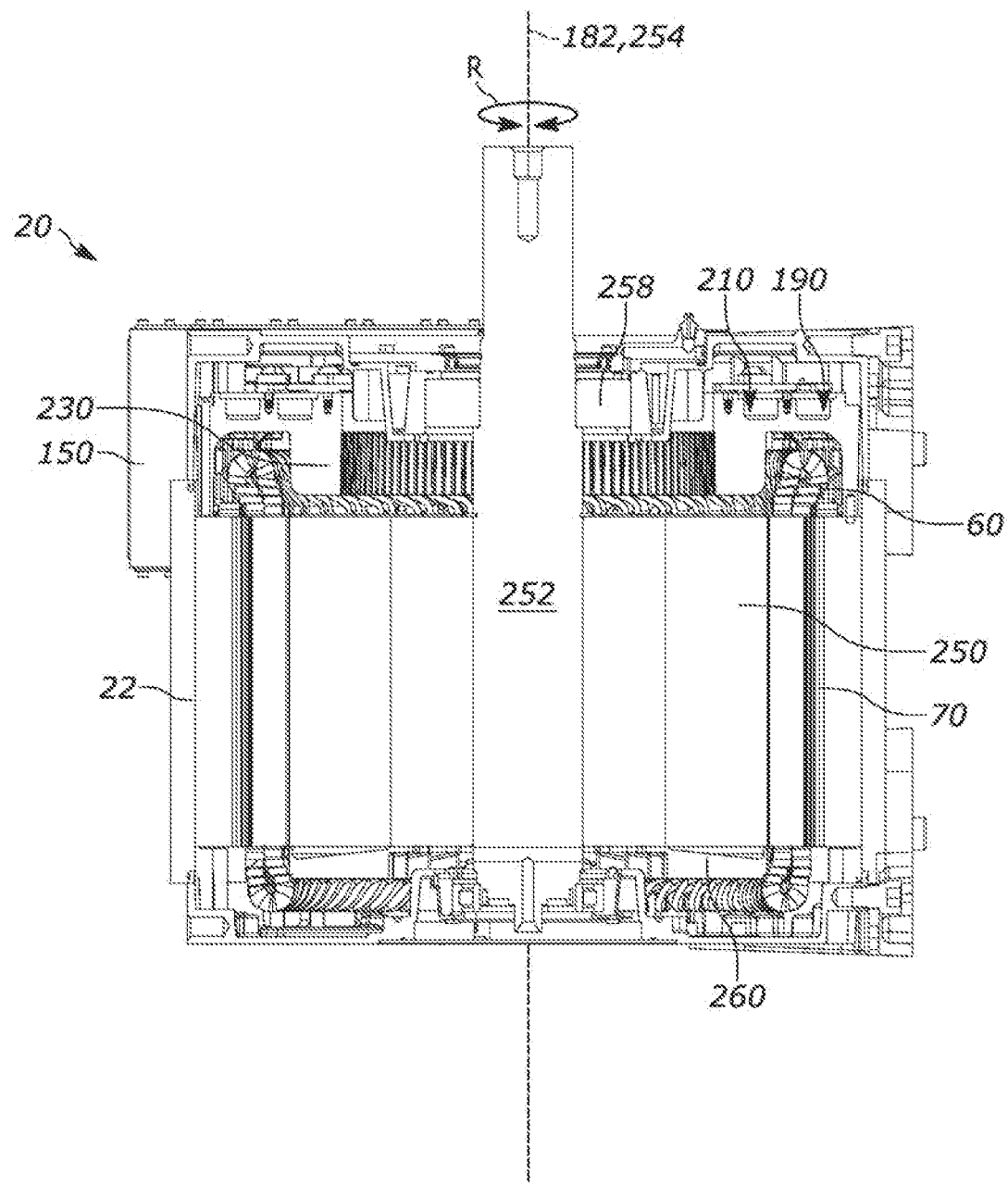
FIG. 8 is a section view of the rotor of FIG. 7A within a stator.

In either case, rotation of the shaft 252 attached to the rotor 250 in the manner indicated by the arrow R in FIG. 8 rotates the fan 260 secured thereto. The rotating fan 260 creates a pressure differential that generates airflow A around and along the rotor 250. More specifically, the fan 260 draws in air axially ("up" as shown) through axial openings in the rotor 250 and returns the air ("down" as shown) through the radial air gap between the rotor and the stator 22. Since the fan 260 is secured directly to the shaft 252, increasing the shaft rotation speed likewise increases the fan rotation speed.

The airflow A passes over and through the fins 230 in the manifold 180. As a result, heat generated in the rotor 250 is removed by forced convection from the fan 260 and transferred into the colder manifold 180. The removed heat then passes through the manifold 180 to the cooling fluid flowing in one or both cooling channels 190, 210. The degree of heat convection out of the circulating airflow A and into the cooling liquid is proportional to the surface area of the fins 230 and, thus, the fins can be designed and configured to provide a desired degree of cooling of the rotor 250.

Moreover, heat removal from the circulating airflow A occurs while the manifold 180 is circulating cooling fluid between the fluid reservoir 150 and the cooling devices 70. Consequently, the cooling fluid is also capable of removing heat from the circulating airflow A around the rotor 250, thereby enabling the manifold 180 to act as a heat exchanger with not only the cooling devices 70 in the stator 22 but also with the rotor. More specifically, heat can be removed from the circulating airflow A and passed through the manifold 180 to the cooling fluid flowing in one or both cooling channels 190, 210.

The manifold 180 is also configured to help cool the motor connections 280, 290 during operation of the rotary electric machine 20. The motor connections 280, 290 are electrically insulated from the manifold 180. Referring back to FIG. 1, since the motor connections 280, 290 are axially aligned with the cooling channels 190, 210 heat generated during operation of the motor connections can pass through the manifold 180 and/or cover plates 206, 226 into the cooling liquid in one or both cooling channels. The alignment and close proximity of the motor connections 280, 290 with the cooling channels 190, 210 allows the cooling liquid therein to remove a large percentage of the heat generated by the motor connections, e.g., up to about 80% of the generated heat.

What have been described above are examples of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

What is claimed is:

1. A rotary electric machine comprising:
   a stator having teeth arranged about an axis, the teeth being spaced apart by slots;
   conductors extending around the teeth and through the slots;
   cooling devices provided in the slots, each cooling device being fluidly connected to an inlet tube and an outlet tube; and
   a manifold comprising:
      a first cooling channel fluidly connected to each inlet tube,
      a second cooling channel fluidly connected to each outlet tube;
      first connecting passageways extending radially from the first cooling channel and fluidly connecting the first cooling channel to the inlet tubes of the cooling devices, and
      second connecting passageways extending radially from the second cooling channel and fluidly connecting the second cooling channel to the outlet tubes of the cooling devices.

2. The rotary electric machine recited in claim 1, wherein the first and second cooling channels extend circumferentially about the axis and are concentric with one another.

3. The rotary electric machine recited in claim 1, wherein for each cooling device, cooling fluid flows a first circumferential distance within the first cooling channel to the inlet tube and flows a second circumferential distance within the second cooling channel away from the outlet tube, a sum of the first and second circumferential distances being substantially equal for each cooling device.

4. The rotary electric machine recited in claim 1, further comprising fins extending axially from the manifold and arranged in an annular pattern about the axis for removing heat from the stator with circulating air.

5. The rotary electric machine recited in claim 4, wherein the fins are configured to collectively encircle a rotor.

6. The rotary electric machine recited in claim 1, further comprising at least one motor connection electrically connected to the conductors and secured to the manifold outside the first and second cooling channels, the at least one motor connection being aligned with the first and second cooling channels such that heat generated in the at least one motor connection is removed by cooling fluid flowing through the first and second cooling channels.

7. The rotary electric machine recited in claim 6, wherein the first connecting passageways are fluidly connected to first tubes extending from the manifold for receiving the inlet tubes and the second connecting passageways are fluidly connected to second tubes extending from the manifold for receiving the outlet tubes.

8. The rotary electric machine recited in claim 7, further comprising a rotor rotatable within and relative to the stator, a fan being secured to and rotatable with the rotor for generating airflow for cooling the rotor.

9. The rotary electric machine recited in claim 1, wherein a fan is configured to direct airflow over the manifold such that cooling fluid flowing through the first and second cooling channels removes heat from the airflow.

10. The rotary electric machine recited in claim 9, further comprising fins extending axially from the manifold and arranged in an annular pattern about the axis for removing heat from a rotor.

11. A rotary electric machine comprising:
a stator having teeth arranged about an axis, the teeth being spaced apart by slots;
conductors extending around the teeth and through the slots;
cooling devices provided in the slots, each cooling device being fluidly connected to an inlet tube and an outlet tube; and
a manifold comprising:
  a first cooling channel fluidly connected to each inlet tube,
  a second cooling channel fluidly connected to each outlet tube; and
cover plates having a friction weld connection with the manifold for covering the first and second cooling channels in a fluid-tight manner.

* * * * *